Patented Mar. 7, 1933

1,900,751

UNITED STATES PATENT OFFICE

HANS BAEHR, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY

PURIFICATION OF GASES

No Drawing. Application filed April 14, 1930, Serial No. 444,338, and in Germany February 27, 1928.

I have filed applications in Germany on February 16th, February 21st, February 27th and April 7th 1928, in France on February 9th, 1929, and in Great Britain on June 20th, 1928.

The present invention relates to an improved process for the purification of gases and for the recovery of valuable by-products. The invention relates more particularly to the removal of hydrogen sulphide, including volatile organic compounds of sulphur, from gases, especially such gases as contain constituents of combustible nature or constituents having reducing properties, by a catalytic oxidation of the hydrogen sulphide and other sulphur compounds. Examples of such gases are coal gas, producer gas, low-temperature-carbonization gas, natural gas and the like. In the said catalytic oxidation care must be taken that only the hydrogen sulphide is attacked by the oxidizing agents, while the oxidation of the other combustible or reducing constituents of the gases and also of the ammonia if such is present in the gas must be avoided, since otherwise the value of the purified gases would be considerably reduced.

It is already known that the said gases can be purified by passing them, after the addition of a suitable amount of oxygen or air, over catalysts, at 300° to 350° C., by which treatment the hydrogen sulphide is transformed into sulphur dioxide or trioxide. Catalysts hitherto proposed for the oxidation of hydrogen sulphide, are for example nickel, iron, cobalt, copper and the like, (which metals as is well known are capable of readily combining with sulphur and sulphur compounds at comparatively low temperatures, but which during the said catalytic oxidation of course remain unaltered, leaving the sulphur compounds in the gas under treatment), either alone or with additions of one or more oxygen transferring elements of the groups 4, 5 and 6 of the periodic system, such as chromium, vanadium, silicon, carbon or molydenum and the like. These known catalysts have certain defects in that the range of temperature within which the reaction proceeds completely is only a restricted one. This defect becomes particularly manifest when the gases to be purified have a high content of hydrogen sulphide, since in such cases the heat of the reaction produced during the catalytic oxidation of the hydrogen sulphide readily causes the temperature of the gas to rise above the upper temperature limit which should not be surpassed in order to obtain a complete reaction, so that the gas leaving the catalyst still contains hydrogen sulphide. Moreover, catalysts with a narrow temperature range require increased care in use.

The sulphur oxides formed in the conversion of hydrogen sulphide have hitherto been recovered, together with the ammonia as ammonium sulphite, or sulphate by wet or dry methods, for example, by washing or by electrical precipitation. In the case of gases free from ammonia, a suitable amount of ammonia can be added to the gas, either before or after the catalytic oxidation, or the gaseous mixture containing sulphur dioxide can be scrubbed with alkaline or saline scrubbing liquors, such as solutions of ammonia, lime water, caustic soda solution, ammonium sulphite, and the like.

The sulphite or mixtures of sulphite and sulphate recoverable in one or the other way are, however, difficult to dispose of profitably as such, and must therefore be brought into a marketable form. This change can be effected by conversion of the sulphite with stronger acids, such as sulphuric acid, phosphoric acid or the like, in which case sulphurous acid on the one hand, and a salt chiefly adapted for manurial purposes, on the other, are recovered. Another method consists in heating acid sulphite solutions at about 200° C. under pressure, the sulphite being thereby converted into sulphate and sulphur.

It will be seen from the foregoing that it is essential for successfully carrying out the process on an industrial scale, on the one hand to completely oxidize the hydrogen sulphide while leaving unaltered the other constituents of the gas to be treated which are susceptible to oxidation, and on the other hand to dispose of or utilize the sulphite liquors for the production of commercially valuable products. Now by the present invention, both said stages of the known process as hereinbefore set forth are substantially improved, so that the process can be employed with great advantage and success in working on an industrial scale.

I have found that a particularly good and complete oxidation of the hydrogen sulphide can be effected by carrying out the catalytic oxidation by means of catalysts which contain as the main constituents metals capable of directly combining with sulphur, by which term are meant nickel, iron, cobalt, manganese, zinc and copper, or their compounds, either alone or together with one or more oxygen transferring metals or metalloids of groups 4, 5 and 6 of the periodic system, such as chromium, vanadium, molybdenum, cerium, uranium, thorium, tungsten, silicon, carbon and the like, and in addition thereto small quantities, up to about 10 per cent, but preferably about 5 per cent, of lead or bismuth or their compounds, or of alkali metal or alkaline earth metal compounds, in particular salts. Suitable compounds to be added are for example the oxides, hydroxides, carbonates or sulphates of potassium, sodium, barium or calcium. By these additions the aforesaid catalysts are substantially activated. The activators mentioned in the foregoing are to be regarded as equivalents for the purposes of the present invention. It is often particularly advantageous to employ several of the aforesaid activators simultaneously, for example lead together with potassium hydroxide, or bismuth with barium hydroxide. After being activated by the aforesaid additions, the catalysts exhibit the following advantages. The initial temperature at which the reaction begins is about 40° to 50° C. lower than with the corresponding unactivated catalysts. The temperature range within which the reaction proceeds to completion is wider in the case of the activated catalysts, so that the reaction temperatures are easily maintained, especially in the case of a high content of hydrogen sulphide.

In most cases the aforesaid new catalysts must be employed while being deposited on carriers, for example, pumice stone, burnt fireclay, silica gel and the like; in such case the catalysts are prepared, for example, by impregnating the said carriers with a solution of the nitrates of the catalyst metals and thereupon calcining the material thus prepared. As a rule the amount of catalyst present on the support should be in the proportion of not more than 10 kilograms of the catalyst per inch 100 liters of the support and in most cases it will even be substantially lower. For example, for purifying coal gas an amount of 0.5 kilogram per each 100 liters is most favorable, whereas in the case of producer gas it may be from about 2 to 6 kilograms. Generally speaking, the amount of catalyst present on a given volume of the support should be the lower, the more hydrogen is present in the gas to be treated.

A catalyst for use according to my present invention may be prepared for example as follows: 45 per cent of nickel, 45 per cent of cobalt and 10 per cent of lead in the form of their nitrates are dissolved in water. 100 liters of pumice of about 2 to 3 centimeters in diameter are soaked with an amount of the resulting solution containing 1 kilogram of the metals. The mass is then dried and ignited at 400° C. The resulting catalyst is suitable for purifying illuminating gas.

Another catalyst can be obtained as follows: 80 per cent of nickel and 5 per cent of bismuth in the form of their nitrates and 15 per cent of vanadium in the form of ammonium vanadate are dissolved in water. 100 liters of coke (in lumps of about 2 to 3 centimeters in diameter) are soaked with an amount of this solution corresponding to 4 kilograms of the metals. The water is then evaporated and the mass heated to about 500° C. Thereupon the mass is mixed with an aqueous solution of 0.1 kilogram of barium hydroxide, dried and ignited. The resulting catalyst is particularly suitable for the purification of producer gas.

The process according to my present invention is carried out at elevated temperature, usually between about 100° and 700° C. but I prefer to operate at temperatures of between about 200° to 400° C. The process according to my invention may be carried out under any desired pressure, for example, at atmospheric pressure, but also at elevated pressures, for example 10, 50, 100 atmospheres or even higher pressures, for example, 200 or even 1000 atmospheres. I have found it particularly advantageous to operate under pressure when desulphurizing such gases as are derived from a process carried out under pressure, such as the destructive hydrogenation of carbonaceous materials, and when the said gases are returned after purification to the process in circulation, since the necessity for releasing the pressures is thereby avoided.

For successfully carrying out the process according to my invention it is necessary that the amount of air or oxygen added to the gas before the catalytic treatment is properly adjusted. On the one hand, it must be sufficiently large to effect complete conversion of the hydrogen sulphide at least into sulphur dioxide, but on the other hand a large excess of oxygen or air must be avoided, since otherwise the valuable constituents of the gas, such as hydrogen, carbon monoxide or ammonia, might suffer oxidation. I therefore prefer to work either with the amount of air or oxygen theoretically required for the conversion of the hydrogen sulphide into sulphur dioxide, or with only a slight excess of not more than from 10 to 20 per cent of the amount theoretically required.

The gases to be purified often contain impurities, such as tar, oils, hydrocarbons and the like, which are deposited on the surface of the catalysts and thus decrease their efficiency. Decomposition or cracking of the impurities in the gas is also a matter of very common occurrence at the temperature of the reaction, so that carbon is deposited on the surface of the catalyst which is rendered inactive, so that the proportion of hydrogen sulphide converted diminishes as the action of the catalyst is impaired.

I have found that nevertheless complete conversion of the hydrogen sulphide can be obtained, even in contaminated gases, by allowing the initial temperature, at which the reaction begins, to rise in accordance with the degree of contamination of the surface. Thus, for example, as the activity of the catalyst decreases, the temperature of the reaction is increased by about 5° C. every three days. In the case of very impure gases it is advisable, in addition to this precaution, to withdraw a portion of the catalyst continuously from the gas intake end of the contact apparatus, and to re-charge the catalyst at the gas outlet end after purification, for example by means of an air blast, rubbing off the surface in a rotary screen, or burning off the impurities.

In this way it is possible to obtain a quantitative conversion of the hydrogen sulphide, even in the case of gases with a high content of hydrogen sulphide and strongly contaminated with other impurities.

After the catalytic process, the hydrogen sulphide is present as sulphur dioxide or trioxide in the gas. These sulphur oxides may be recovered, in a suitable manner, direct as acid sulphite liquors, so that these latter may at once be subjected to decomposition under pressure. For this purpose, in the case of ammoniacal initial gases so much of the ammonia is removed according to my present invention, from the gas by scrubbing or cooling prior to the catalytic process, that the residual ammonia suffices to furnish an acid sulphite liquor with the sulphur oxides, when scrubbed. I have found that a liquor containing at least two parts of bisulphite to 1 part of sulphite is particularly suitable for the conversion of the sulphite by heating under pressure. That portion of the ammonia which is recovered by cooling the distillation gas and is not required for maintaining this ratio between ammonia and sulphurous acid, can be utilized in other suitable ways, as for example for washing out the final traces of sulphur dioxide, or for neutralizing the sulphate liquors which may still be acid after the heating under pressure, and the like.

If gases devoid of or not containing sufficient ammonia are to be freed from hydrogen sulphide by the process, there is added, before or during the first scrubbing, only a sufficient amount of ammonia or other alkaline absorption agent to ensure that the sulphite liquor coming from the first scrubbing process contains so much free acid that its composition corresponds to that indicated above and that it can at once be subjected to the treatment of heating under pressure.

Any residual amounts of sulphur oxides still present in the gas can be removed by one or more subsequent scrubbing operations.

I have also found it highly suitable and advantageous to carry out the conversion of the acid sulphite liquors by the heating under pressure as a continuous process. Owing to its having a specific gravity greater than that of the sulphate liquor, the sulphur resulting from the decomposition of the sulphite falls to the bottom and can be drawn off therefrom in a fluid condition, whilst the sulphate liquor can be run off from the upper part of the separating vessel. It is preferable that the conversion of the sulphite should not be carried to a quantitative completion, but only to such an extent that several units per cent of undecomposed sulphite still remain in the liquor. The liquor which has been heated under pressure and still contains undecomposed sulphite deposits pure sulphate on cooling, or after concentration if necessary, whilst the sulphite remains in the mother liquor, which can then be returned to the scrubbers as the absorption liquid. This method of operating has the advantage over the older methods that the conversion of the liquors is effected at a lower temperature and in a shorter time.

The term "hydrogen sulphide" when employed in the present application also comprises volatile organic compounds of sulphur.

The following examples will further explain the nature of the invention which, however, is not restricted thereto.

*Example 1*

Coal distillation gas containing 0.8 per cent by volume of $H_2S$ and 1.2 per cent by volume of ammonia, is cooled down to about 20° C., whereby about 35 to 40 per cent of the ammonia present in the gas passes into the gas liquor. The gas is then heated to about 280° C. and mixed with about 8 per cent by volume of air, the mixture being passed over a catalyst composed of 95 per cent by weight of nickel and 5 per cent by weight of lead. These metals are deposited in the form of their nitrates on pumice in the proportion of 0.5 kilogram of the metals per each 100 liters of the pumice, and the mass is calcined after drying, thereby converting the nitrates into oxides. On contact with this catalyst the hydrogen sulphide in the gas is completely decomposed into about 90 per cent of sulphur dioxide and 10 per cent of sulphur trioxide, with the liberation of such an amount of heat that the temperature of the gas attains about 400° C. at the point where it leaves the catalyst. At the outset the temperature at which the catalytic oxidation is quantitative is about 280° C., but after about three days the final gas product obtained with this temperature is no longer obtained free from hydrogen sulphide, and the initial temperature has to be raised to 285° C. At the end of each succeeding period of three days the reaction temperature is raised by 5° C., under which conditions the conversion of the hydrogen sulphide is always complete.

From the contact apparatus, the gas is passed through a heat-exchanger and condenser into a scrubber through which an acid ammonium sulphite liquor is passed in counter-current to the gas, which liquor retains all the sulphur oxides except about 10 per cent, the ammonia being completely extracted. The condenser furnishes an acid liquor, which contains about 15.0 kilograms of ammonium sulphite and 30.0 kilograms of ammonium bisulphite per 100 liters, the further treatment of which will be hereinafter described.

After treatment in the first scrubber, the gas is passed through a second tower, containing as an absorbent, a flow of dilute ammonia liquor obtained from, or consisting of, the gas liquor obtained in cooling the crude initial gas. On issuing from the second scrubber, the gas is free from ammonia and hydrogen sulphide.

The acid sulphite liquor issuing from the first tower is forced through a coil heated to about 200° C., the sulphite being thereby split up into ammonium sulphate and sulphur. The reaction mixture then passes into a separating vessel, where the sulphur sinks to the bottom, and can be drawn off in a fluid condition, whilst the sulphate liquor can be run off from the upper part of the separator. After a slight concentration and cooling, this liquor furnishes about 25 kilograms of ammonium sulphate for each 100 liters of the acid sulphite liquor containing about 15.0 kilograms of ammonium sulphite and 30.0 kilograms of ammonium bisulphite. 10 kilograms of sulphate and 3.5 kilograms of sulphite remain in the mother liquor, which is then pumped back to the first scrubber, for use as scrubbing liquor. 4.8 kilograms of sulphur are recovered from each 100 liters of the said acid sulphite liquor.

*Example 2*

Illuminating gas containing 8 grams of hydrogen sulphide per cubic meter is mixed with about 10 per cent its volume of air and the mixture is preheated to about 300° C. 200 liters of this gas mixture are passed per hour over 10 cubic centimeters of a catalyst consisting of nickel oxide, cerium oxide and lead oxide on pumice, in the proportion of 0.5 gram of the metals per each 100 cubic centimeters of the pumice. This catalyst is prepared by bringing the nitrates of the said metals into pumice and converting them into oxides by igniting. The metals are present in the catalyst in the proportion of 92 per cent of nickel, 3 per cent of cerium and 5 per cent of lead. The hydrogen sulphide can be completely oxidized at between 330° and 410° C. When passing the double amount of gas per hour over 10 cubic centimeters of the said catalyst the temperature range is between 340° and 530° C.

Instead of the catalyst referred to in the foregoing also a contact mass containing 90 per cent of nickel and 10 per cent of lead may be used in which case the temperature range is from 310° to 420° C. at 200 liters of the gas per hour and 380° to 490° C. at 400 liters of gas per hour and per each 10 cubic centimeters of the catalyst.

*Example 3*

The gas mixture referred to in Example 2 is passed over a catalyst prepared in the manner described in Example 2 and containing 92 per cent of cobalt, 3 per cent of chromium and 5 per cent of lead, in the proportion of 0.5 gram of the metals per each 100 cubic centimeters of the pumice. A quantitative conversion is obtained at between 330° and 440° C. when passing 200 liters of the gas per hour over 10 cubic centimeters of the catalyst.

When treating hydrogen, blue-water gas, producer gas, carbon-monoxide and the like gases, contaminated with hydrogen sulphide, the range of temperatures at which the reaction can be carried out is still greater than when purifying illuminating gas, coke-oven gas or gases from the low-temperature-carbonization. Moreover the lower temperature limit is lower in the case of the first mentioned gases than with the latter gases.

*Example 4*

Illuminating gas containing 8 grams of hydrogen sulphide and 9 grams of ammonia is mixed with between 8 and 10 per cent its volume of air and the mixture is preheated to about 270° C. by heat exchange with the hot gases leaving the catalyst. The mixture is brought at the said temperature into contact with a catalyst prepared as follows:

1000 liters of pumice are evaporated with a solution of 50 gilograms of nickel nitrate and the mixture is then ignited until the nitrate is completely decomposed. Thereupon the mixture is treated with a solution of 5 kilograms of potassium hydroxide in 300 liters of water and again evaporated to dryness. When passing over 30 liters of this catalyst 100 cubic meters of the aforesaid gas per hour the reaction proceeds completely at between 280° and 440° C., while with a speed of 200 cubic meters of gas per hour the temperature range is between 300° and 480° C.

*Example 5*

Brown-coal producer gas containing 3 grams of hydrogen sulphide per cubic meter is mixed with about 5 per cent of air and preheated to 220° C. A catalyst is prepared by evaporating 1000 liters of coke with an aqueous solution of 100 kilograms of cobalt nitrate and 3 kilograms of lead nitrate and igniting the mass until oxides of nitrogen are no longer evolved. Thereupon the mass is evaporated again to dryness with a solution of 5 kilograms of barium hydroxide in 300 liters of water. When passing 100 cubic meters of the aforesaid gas per hour over 30 liters of this catalyst, complete oxidation of the hydrogen sulphide to sulphur dioxide takes place at between 220° and 380° C., while at a speed of the gas of 200 cubic meters per hour the temperature range is between 240° and 460° C.

*Example 6*

Blue water gas containing 5 grams of sulphur per cubic meter is mixed with 5 per cent by volume of air, heated to 300° C. and passed at a rate of 200 liters per hour over 10 cubic centimeters of a catalyst which is prepared as follows:

8 kilograms of manganese oxide and 0.8 kilogram of nickel oxide are mixed with 500 kilograms of clay and made into a paste after the addition of water. By means of a suitable press the mixture is brought into the shape of pipes 30 millimeters in diameter and partially dried. The pipes are cut up into portions about 25 millimeters in length, completely dried and ignited. The resulting particles are soaked with an aqueous solution of 0.2 kilogram of sodium hydroxide and dried again.

Instead of the manganese oxide in the above catalyst zinc oxide may also be employed.

*Example 7*

Low-temperature-carbonization gas containing 2 per cent by volume of hydrogen sulphide is preheated to 200° C., mixed with 4 per cent by volume of oxygen and passed at a rate of 200 liters per hour over 10 cubic centimeters of a catalyst which has been prepared as follows:

So-called Raschig rings consisting of a chromium nickel alloy containing 83 per cent of nickel and 17 per cent of chromium are heated for 2 hours to about 1200° C. in a current of air. The alloy is superficially oxidized to the corresponding metal oxides. The rings are then cooled, immersed into an aqueous solution of potassium carbonate of 0.5 per cent strength and dried.

Instead of the above chromium nickel alloy, chromium steels may also be used as catalysts after a similar treatment.

The conversion of the hydrogen sulphide begins at 290° C. By the heat evolved by the reaction the temperature is increased to 470° C. The heat of the gases leaving the catalyst may be supplied to the initial gas by means of heat exchangers.

This application is a continuation-in-part of my application for patent, Ser. No. 330,617 filed January 5, 1929.

What I claim is:—

1. The process for the purification of gases contaminated with hydrogen sulphide which comprises passing the gas in the presence of sufficient oxygen to oxidize the hydrogen sulphide to sulphur dioxide, at a temperature between about 100° and 700° C. over a catalyst comprising an oxide of a metal having an atomic weight ranging from 54.93 to 65.38, capable of directly combining with sulphur, and up to 10 per cent of a substance selected from the group consisting of lead, bismuth, their compounds, and the compounds of the alkali metals and alkaline earth metals and increasing the temperature about 5° C. every three days as the activity of the catalyst decreases.

2. The process for the purification of gases contaminated with hydrogen sulphide which comprises passing the gas in the presence of sufficient oxygen to oxidize the hydrogen sulphide to sulphur dioxide, at a temperature between about 200° and 400° C. over a catalyst comprising an oxide of a metal having an atomic weight ranging from 54.93 to 65.38, capable of directly combining with sulphur, and up to 10 per cent of a substance selected from the group consisting of lead, bismuth, their compounds, and the compounds of the alkali metals and alkaline earth metals and increasing the temperature about 5° C. every three days as the activity of the catalyst decreases.

3. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising an oxide of a metal having an atomic weight ranging from 54.93 to 65.38, capable of directly combining with sulphur, an oxygen transferring element of groups 4 to 6 of the periodic system, and up to 10 per cent of a substance selected from the group consisting of lead, bismuth, their compounds, and the compounds of the alkali metals and alkaline earth metals.

4. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising an oxide of a metal having an atomic weight ranging from 54.93 to 65.38, capable of directly combining with sulphur, and up to 10 per cent of a mixture of a substance selected from the group consisting of lead, bismuth and their compounds, with a substance selected from the compounds of the alkali metals and alkaline earth metals.

5. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising an oxide of a metal having an atomic weight ranging from 54.93 to 65.38, capable of directly combining with sulphur, and up to 10 per cent of a substance selected from the group consisting of lead, bismuth, their compounds, and the compounds of the alkali metals and alkaline earth metals, said catalyst being employed on a support in the proportion of not more than 10 kilograms of the catalyst for each 100 liters of said support.

6. The process for the purification of gases contaminated with hydrogen sulphide which comprises the step of passing the gas in the presence of sufficient oxygen to oxidize the hydrogen sulphide to sulphur dioxide, at a temperature between about 200° and 400° C. over a catalyst comprising an oxide of a metal having an atomic weight ranging from 54.93 to 65.38, capable of directly combining with sulphur, and up to 10 per cent of a substance selected from the group consisting of lead, bismuth, their compounds, and the compounds of the alkali metals and alkaline earth metals, said catalyst being employed on a support in the proportion of not more than 10 kilograms of the catalyst for each 100 liters of said support.

7. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising an oxide of a metal having an atomic weight ranging from 54.93 to 65.38, capable of directly combining with sulphur, an oxygen transferring element of groups 4 to 6 of the periodic system, and up to 10 per cent of a substance selected from the group consisting of lead, bismuth, their compounds, and the compounds of the alkali metals and alkaline earth metals, said catalyst being employed on a support in the proportion of not more than 10 kilograms of the catalyst for each 100 liters of said support.

8. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising an oxide of a metal having an atomic weight ranging from 54.93 to 65.38, capable of directly combining with sulphur, and up to 10 per cent of a mixture of a substance selected from the group consisting of lead, bismuth and their compounds, with a substance selected from the compounds of the alkali metals and alkaline earth metals, said catalyst being employed on a support in the proportion of not more than 10 kilograms of the catalyst for each 100 liters of said support.

9. The process for the purification of gases contaminated with hydrogen sulphide which comprises the step of passing the gas in the presence of sufficient oxygen to oxide the hydrogen sulphide to sulphur dioxide, at a temperature between about 100° and 700° C. over a catalyst comprising nickel oxide, and up to 10 per cent of a substance selected from the group consisting of lead, bismuth, their compounds, and the compounds of the alkali metals and alkaline earth metals.

10. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising nickel oxide and about 5 per cent of lead.

11. The process for the purification of gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising nickel oxide and about 5 per cent of lead, said catalyst being employed on a support in the proportion of not more than 10 kilograms of the catalyst for each 100 liters of said support.

12. The process for the purification of combustible gases contaminated with hydrogen sulphide which comprises passing the gas in the presence of sufficient oxygen to oxidize the hydrogen sulphide to sulphur dioxide, at a temperature between about 100° and 700° C. over a catalyst comprising an oxide of a heavy metal, capable of directly combining with sulphur, and up to 10 per cent of a substance selected from the group consisting of lead, bismuth, their compounds, with a substance selected from the class consisting of the compounds of the alkali metals and alkaline earth metals and increasing the temperature about 5° C. every three days as the activity of the catalyst decreases.

13. The process for the purification of combustible gases contaminated with hydrogen sulphide which comprises passing the gas in the presence of sufficient oxygen to oxidize the hydrogen sulphide to sulphur dioxide, at a temperature between about 200° and 400° C. over a catalyst comprising an oxide of a heavy metal, capable of directly combining with sulphur, and up to 10 per cent of a substance selected from the group consisting of lead, bismuth, their compounds with a substance selected from the class consisting of the compounds of the alkali metals and alkaline earth metals and increasing the temperature about 5° C. every three days as the activity of the catalyst decreases.

14. The process for the purification of combustible gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising an oxide of a heavy metal, capable of directly combining with sulphur, and up to 10 per cent of a mixture of a substance selected from the group consisting of lead, bismuth and their compounds, with a substance selected from the compounds of the alkali metals and alkaline earth metals.

15. The process for the purification of combustible gases contaminated with hydrogen sulphide which comprises the step of passing the gas in the presence of sufficient oxygen to oxidize the hydrogen sulphide to sulphur dioxide, at a temperature between about 200° and 400° C. over a catalyst comprising an oxide of a heavy metal, capable of directly combining with sulphur, and up to 10 per cent of a substance selected from the group consisting of lead, bismuth, their compounds and the compounds of the alkali metals and alkaline earth metals, said catalyst being employed on a support in the proportion of not more than 10 kilograms of the catalyst for each 100 liters of said support.

16. The process for the purification of combustible gases contaminated with hydrogen sulphide which comprises the step of passing the gas in the presence of sufficient oxygen to oxidize the hydrogen sulphide to sulphur dioxide, at a temperature between about 100° and 700° C. over a catalyst comprising nickel oxide, and up to 10 per cent of a substance selected from the group consisting of lead, bismuth, their compounds, and the compounds of the alkali metals and alkaline earth metals.

In testimony whereof I have hereunto set my hand.

HANS BAEHR.

CERTIFICATE OF CORRECTION.

Patent No. 1,900,751.  March 7, 1933.

HANS BAEHR.

It is hereby certified that error appears in the printed specification of the above numbered patent requiring correction as follows: In the heading to the specification, line 5, date of filing German application, for "February 27" read February 16; page 2, line 61, for "inch" read each; page 4, line 125, for "gilograms" read kilograms; page 6, line 87, claim 9, for "oxide" read oxidize; page 6, line 121, claim 12, and page 7, lines 7, 23 and 37, claims 13, 14 and 15, respectively, for "heavy metal" read metal having an atomic weight ranging from 54.93 to 65.38; and that the said Letters Patent should be read with these corrections therein that the same may conform to the record of the case in the Patent Office.

Signed and sealed this 19th day of June, A. D. 1934.

Bryan M. Battey (Seal)  Acting Commissioner of Patents.